United States Patent [19]

Suzuki

[11] Patent Number: 5,761,340
[45] Date of Patent: Jun. 2, 1998

[54] DATA EDITING METHOD AND SYSTEM FOR A PEN TYPE INPUT DEVICE

[75] Inventor: Hideo Suzuki, Tokyo, Japan

[73] Assignee: Casio Computer Co., Ltd., Tokyo, Japan

[21] Appl. No.: 614,953

[22] Filed: Mar. 11, 1996

Related U.S. Application Data

[63] Continuation of Ser. No. 228,520, Apr. 15, 1994, abandoned.

[30] Foreign Application Priority Data

Apr. 28, 1993 [JP] Japan ................................. 5-102059
May 21, 1993 [JP] Japan ................................. 5-119753

[51] Int. Cl.$^6$ .......................... G06K 9/00; G06K 9/03
[52] U.S. Cl. .................. 382/189; 382/187; 382/311; 345/179
[58] Field of Search ........................ 382/187, 189, 382/313, 309, 311, 186; 345/179; 364/237.9, 709.11; 178/18

[56] References Cited

U.S. PATENT DOCUMENTS

| 4,475,239 | 10/1984 | van Raamsdonk | 382/57 |
| 4,945,504 | 7/1990 | Nakama et al. | 364/709.11 |
| 4,972,496 | 11/1990 | Sklarew | 382/13 |
| 5,012,521 | 4/1991 | Endo et al. | 382/1 |
| 5,297,216 | 3/1994 | Sklarew | 382/189 |
| 5,414,228 | 5/1995 | Yamashita | 382/13 |

OTHER PUBLICATIONS

"Mastering Windows™ 3.1", Robert Cowart, pp. 365, 367–368 & 382–383, 1993.

*Primary Examiner*—Leo Boudreau
*Assistant Examiner*—Bhavesh Mehta
*Attorney, Agent, or Firm*—Frishauf, Holtz, Goodman, Langer & Chick

[57] ABSTRACT

When data to be copied is enclosed on the screen of an input/display device by a figure image represented by an enclosing figure (a circle with an open part), the data is stored together with the figure image. When the same figure image is drawn in a slightly larger size in an unwritten area, a target copy area is automatically set inside the figure image and the stored data is enlarged and displayed in the target copy area according to the dimension of the set area.

4 Claims, 12 Drawing Sheets

KEY FIGURE    IMAGEDATA

| 51 → ⬭ | X X X X<br>X X ← 51' |
|---|---|
| 52 → ⊔ | 〜〜〜<br>〜〜〜 ← 52' |
| 53 → ( ) | *ADC*<br>X X ← 53' |

KEY TABLE

FIG.5

| KEY FIGURE | EDITING COMMAND |
|---|---|
| ⬭ | DELETE |
| ⊔ | RED COLOR |
| ( ) | BOLDFACE |

FIG.9

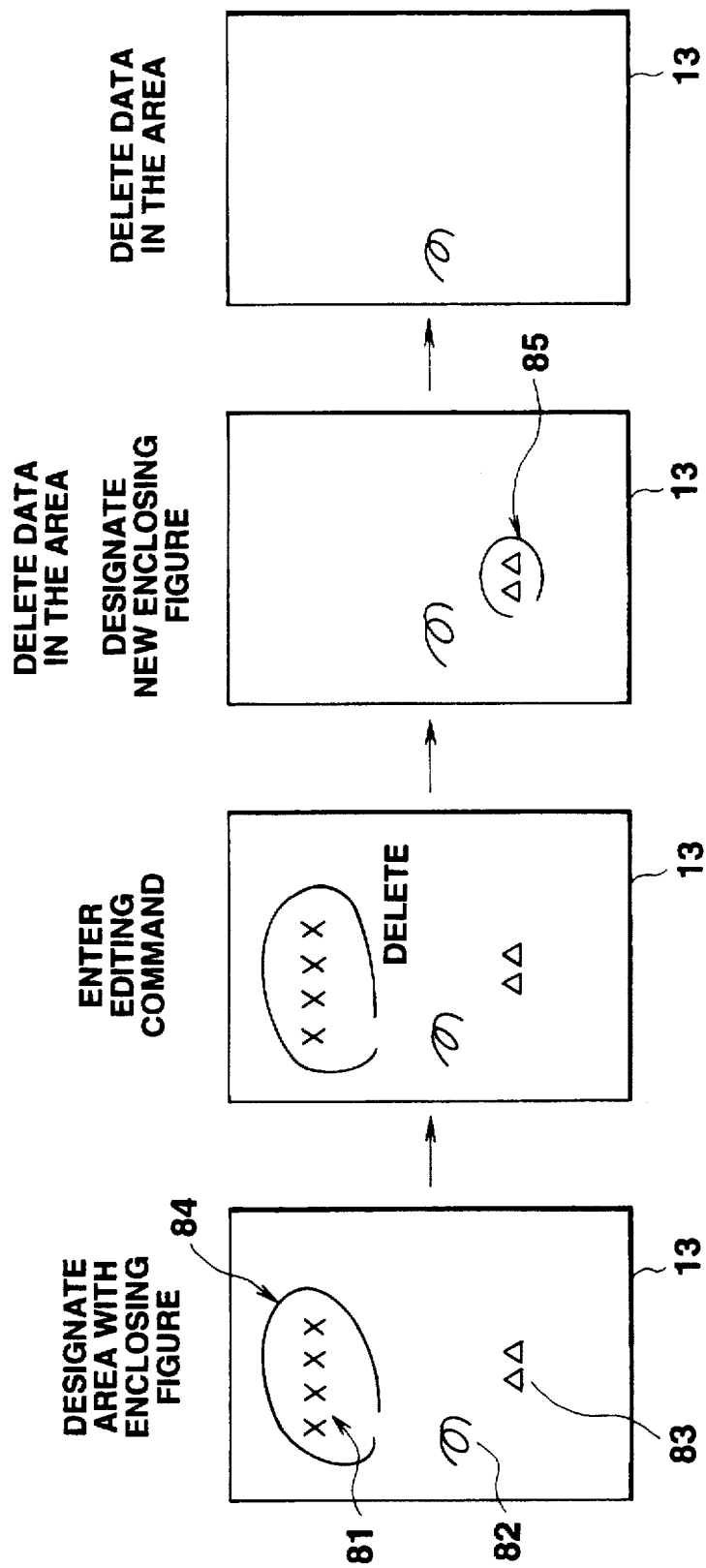

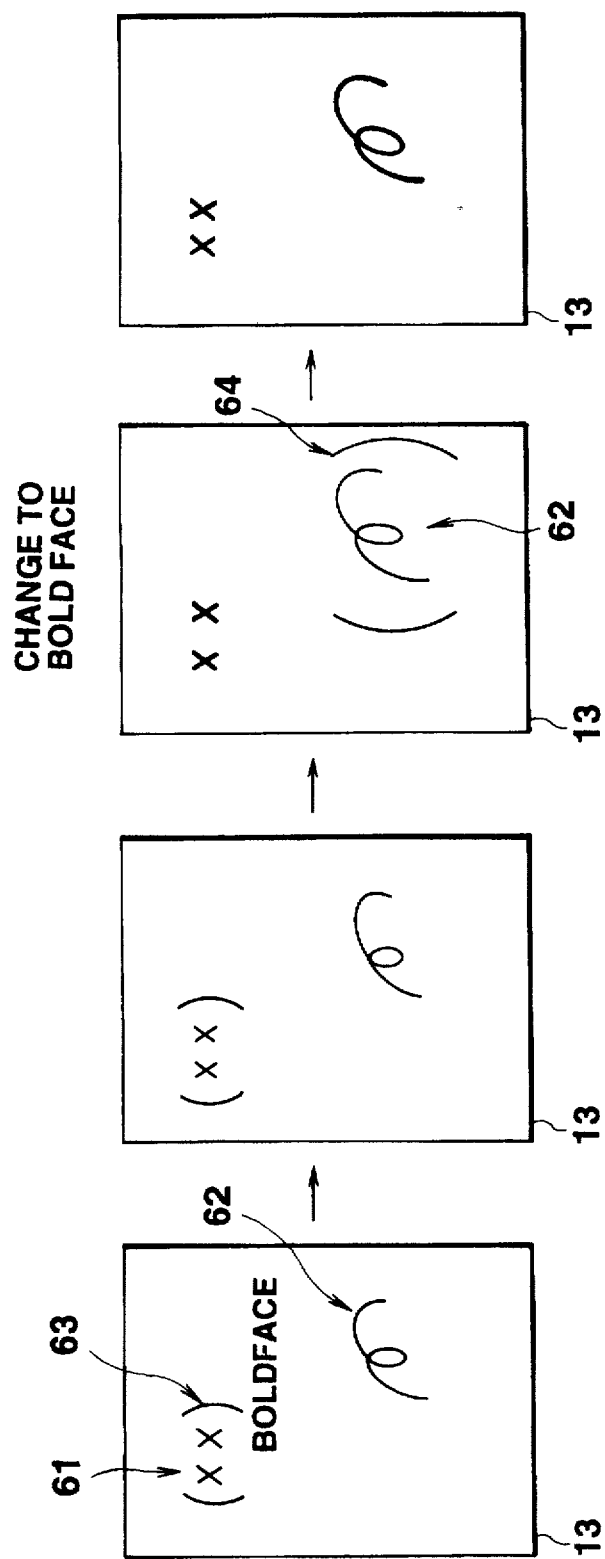

| CONTENTS OF EDITION | EDITING COMMAND |
|---|---|
| DELETE | X, ⋈ |
| COPY | ↻, Ⓒ |
| MOVE | Ⓜ, ↝ |
| RED COLOR | Red, R |

FIG.13

DATA EDITING METHOD AND SYSTEM FOR A PEN TYPE INPUT DEVICE

This application is a continuation of application Ser. No. 08/228,520, filed Apr. 15, 1994, now abandoned.

BACKGROUND OF THE INVENTION

1. Field of the Invention

The present invention relates to a pen type input device which edits display data by a handwriting operation on a display screen.

2. Description of the Related Art

Recently, the importance of the user interface in computers has begun to be recognized. Accordingly, a GUI (Graphical User Interface) which is excellent in operability has become popular.

The GUI allows a user to select an icon using a mouse, a keyboard or the like to execute all the operations except the inputting of characters, such as the selection and execution of a command, the manipulation of a file and the invoking of a program.

Since the conventional GUI is based on the operation of a mouse, however, its operability is not good. In general, users should be somewhat familiar with the use of a mouse to perform a smooth cursor movement to select an icon. Even when the users become familiar with use of the mouse, the cursor movement is not quick enough. Further, there should be some space for manipulating a mouse.

Pen type input systems have recently been receiving people's attention as a solution to such shortcomings of a mouse as a pointing device.

The pen type input system allows a user to directly input characters, figures, etc. on a display screen with the same feeling or touch as writing them on a notebook or pocketbook which people do every day. The pen type input device is most appropriate as a pointing device for a GUI. For example, the selection of an icon can be made by directly tapping the icon by a pen, which is very simple and very quick.

If data copying or other data editing operations, which have heretofore been carried out by a key operation or a mouse operation, can be accomplished by a handwriting operation using a pen, the data editing operation would become easier, thus improving the editing efficiency. Further, this editing work itself, unlike the convention type, would be carried out more naturally.

Schemes that permit editing operations, such as insertion and deletion, by a penned input are known from U.S. Pat. Nos. 4,945,504, 4,972,496 and 4,475,239, for example. The contents of these patents are incorporated herein by reference.

These U.S. patents disclose schemes for deleting data displayed at the position where an editing command image is handwritten or inserting desired input data at such a position.

However, none of these U.S. patents disclose at all a technique for easily specifying data at a desired position on a display screen to copy it to a different position by a handwriting operation, or ensuring enlargement or reduction of copy data at the time of executing such copying by a handwriting operation.

Further, the schemes disclosed in the above-mentioned U.S. Patents require that a predetermined editing command be handwritten every time data is edited (inserted, deleted, etc.). To repeat an editing operation similar to the one that has already been performed, the same operation should be performed. In other words, no consideration on the case of repeating a similar editing operation has been taken in the disclosed schemes.

SUMMARY OF THE INVENTION

It is therefore a primary object of the present invention to provide a method and a system for copying of desired display data by inputting a handwritten image.

It is another object of the present invention to provide a method and a system for permitting an editing operation, such as insertion or deletion, at a desired display position to be repeatedly performed easily by inputting a handwritten image.

To achieve the above objects, according to the first aspect of the present invention, there is provided a data editing method for a pen type input device having a display screen for displaying data and inputting a handwritten image on said display screen through a pen operation, said method comprising the steps of:

specifying data on said display screen at a position corresponding to that of a first figure image, as target data to be edited, when said first figure image is handwritten by a pen operation at a first position on said display screen;

storing said specified target data to be edited in association with said first figure image;

determining if a second figure image, when handwritten by a new pen operation at a second position on said display screen, has a predetermined similarity with said first figure image; and displaying said target data to be edited, which was stored in association with said first figure image, at a display position on said display screen corresponding to said handwritten position of said second figure image if said second figure image is determined to be similar to said first figure image in said determining step.

Further, to achieve the above objects, according to the first aspect of the present invention, there is provided a data processing system comprising:

a display means having a display screen for displaying image data on the display screen;

a pen type pointing member operated by a user, for writing an image on the display screen;

image indicating means for detecting a position and a trace of the pointing member on the display screen;

data specifying means, in response to said position detecting means, for specifying data on said display screen at a position indicated by a predetermined first figure image, as target data, when said first figure image is written by said pointing member on said display screen;

determining means, in response to said position detecting means, for determining whether a second figure image which has a predetermined similarity with the first figure image is input, when a figure image is written by said pointing member on said display screen; and copying means, in response to said specifying means and said determining means, for copying the target data specified by said specifying means at the position indicated by the second figure image on the display screen.

The above design ensures easier copying of desired display data by inputting a handwritten image.

To achieve the above objects, according to the second aspect of the present invention, there is provided a data editing method for a pen type input device having a display screen for displaying data and inputting handwritten image on said display screen through a pen operation, said method comprising the steps of:

specifying data on said display screen at a position corresponding to that of a first figure image, as target data to be edited, when said first figure image is handwritten by a pen operation at a first position on said display screen and an editing command is input;

storing said input editing command;

executing an editing process on said specified target data in accordance with said editing command; and executing an editing process on data displayed at a display position on said display screen corresponding to said handwritten position of a second figure image, in response to said stored editing command, when said second figure image is handwritten by a new pen operation at a second position on said display screen.

Further, to achieve the above objects, according to the second aspect of the present invention, there is provided a data processing system comprising:

a display means having a display screen for displaying image data on the display screen;

a pen type pointing member operated by a user, for writing an image on the display screen;

position detecting means for detecting a position of said pointing member on the display screen;

data specifying means, in response to said position detecting means, for specifying data on said display screen at a position indicated by a predetermined first figure image, as target data to be edited, and an editing command when said first figure image and the editing command are written by said pointing member on said display screen;

determining means, in response to said position detecting means, for determining whether a second figure image has a predetermined similarity with the first figure image, when a second figure image is written by said pointing member on said display screen; and executing means for executing the editing command on data displayed at a position indicated by the second figure image on the display screen.

According to this structure, an editing operations, such as insertion or deletion, at a desired display position can be repeatedly performed easily by inputting a handwritten figure image.

BRIEF DESCRIPTION OF THE DRAWINGS

FIG. 5 is a diagram for explaining the storage form in an image register memory;

FIG. 9 is a diagram for explaining the storage form in an editing command memory according to a third embodiment;

FIGS. 10A to 10D are diagrams (part 1) for explaining display statuses associated with a copying operation according to the third embodiment;

FIGS. 11A to 11D are diagrams (part 2) for explaining display statuses associated with a copying operation according to the third embodiment;

FIG. 13 is a diagram for explaining another example of the editing command.

DETAILED DESCRIPTION OF THE PREFERRED EMBODIMENTS

First Embodiment

A method and system of a first embodiment of the present invention will now be described referring to FIGS. 1 through 5.

Figure 1:
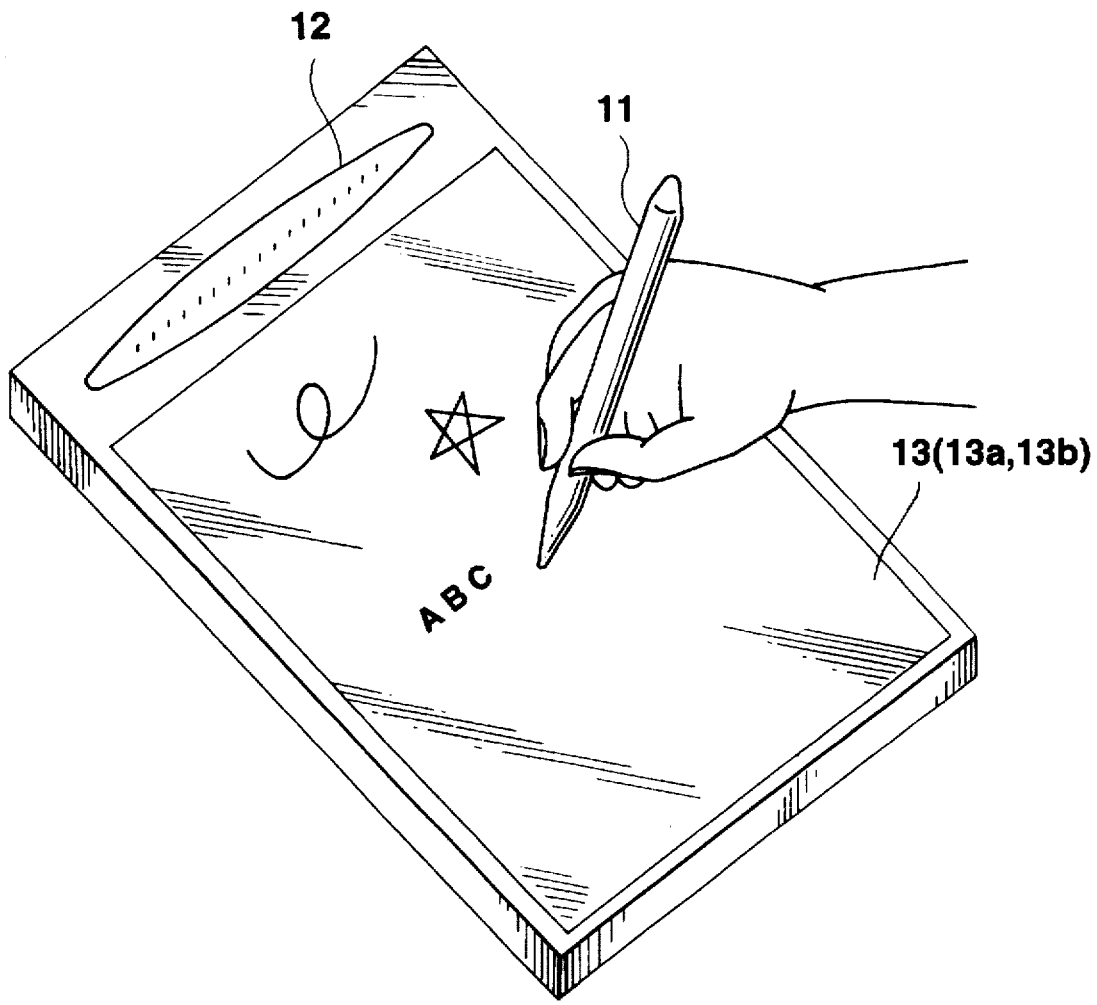
FIG. 1 is a perspective view of a data processing device equipped with a pen type input device according to the first embodiment of the present invention.

FIG. 1 is a perspective view of a data processing device equipped with a pen type input device according to the first embodiment.

The data processing device is designed to basically operate based on handwritten-inputs using a pen (stylus) 11, and has a function to recognize handwritten characters.

The data processing device has the shape of a pad as a whole, with a pen receiving groove 12 formed at the top to receive the pen 11. An input/display device 13 for inputting in pen is provided at nearly the entire top surface of the device, excluding the pen receiving groove 12.

The input/display device 13 includes a tablet. The tablet includes a display screen (display section 13a) of a dot-matrix display type constituted by, for example, a liquid crystal display panel, and an input screen (coordinate input section 13b) overlying the display screen.

Figure 2:
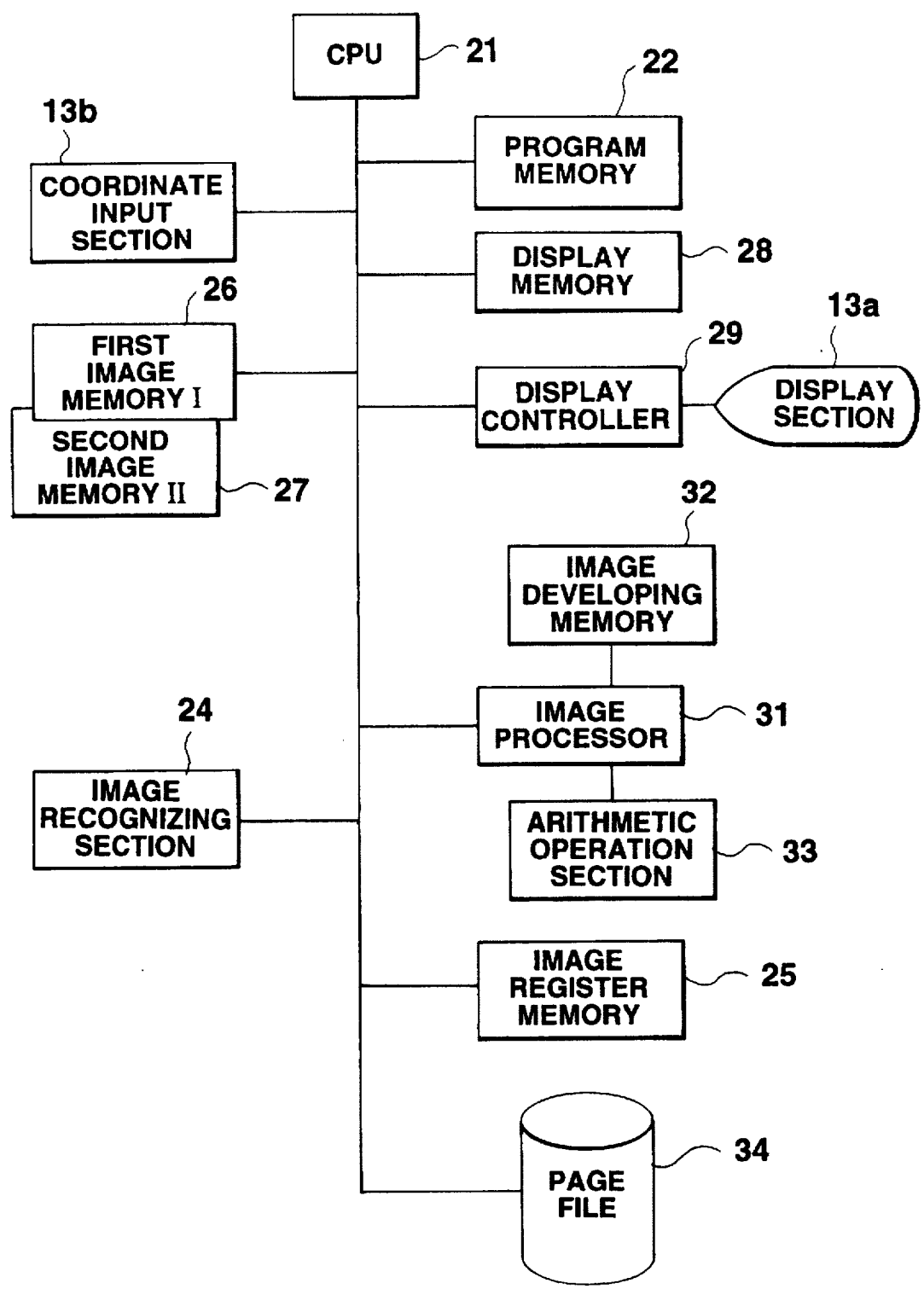
FIG. 2 is a block diagram showing the system structure of the pen type input device.
Figure 3:
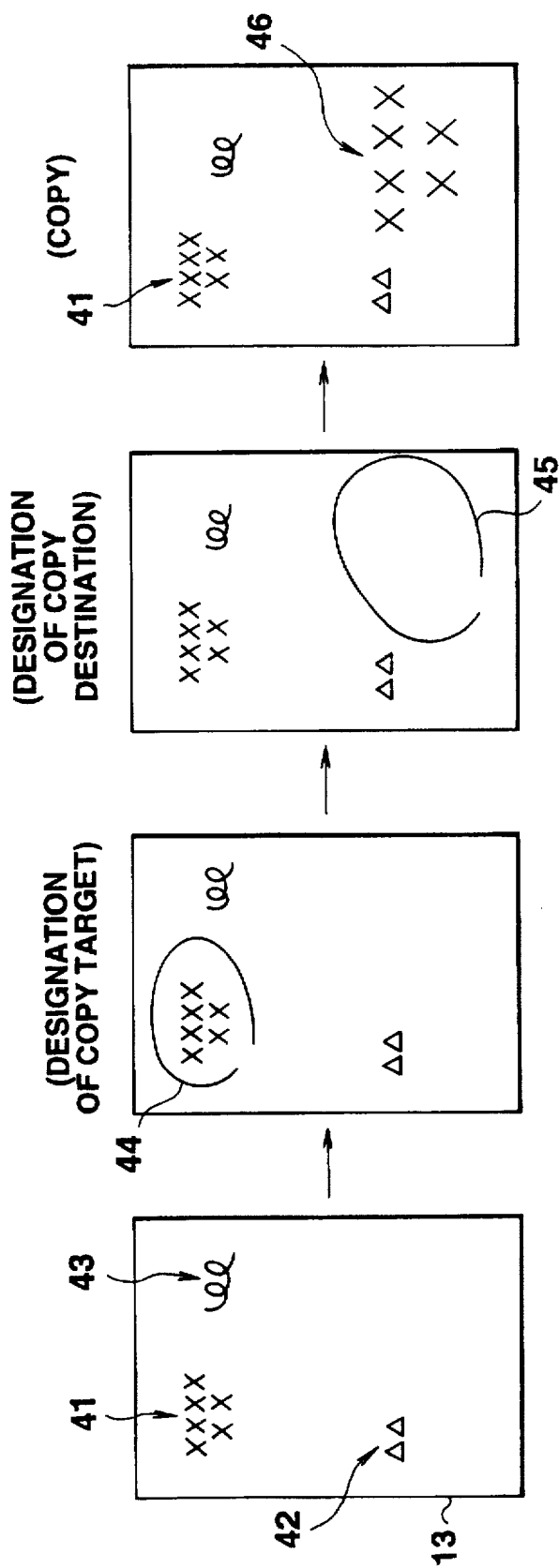
FIGS. 3A to 3D are diagrams for explaining display statuses associated with a copying operation.

FIG. 2 shows the system structure of the data processing device.

Referring to FIG. 2, a CPU (Central Processing Unit) 21 comprises a microprocessor or the like, which runs a program stored in a program memory 22 to control the individual components of the system.

The coordinate input section 13b is a tablet of, for example, a pressure sensitive type or an electromagnetic inductive type. When detecting a penned input, the coordinate input section 13b outputs the coordinates (coordinate data of a locus of a handwritten input) of the penned input to the CPU 21 via an interface. The CPU 21 produces image data handwritten in pen from the coordinate data and writes the image data in a first image memory 26.

In response to an instruction from the CPU 21, an image recognizing section 24 checks whether or not the handwritten image data is a figure (or figure image) enclosing (or specifying) an area having a certain size or a greater size based on the coordinate data, to thereby discriminate a handwritten enclosing figure.

The figure specifying or enclosing an area having the certain size or a greater size is defined as an "enclosing figure" in the present invention. The "enclosing figure" is used to specify an area and image data to be edited, for example.

The image recognizing section 24 sends the recognition result to the CPU 21.

When the recognition result indicates that an enclosing figure has been input, the CPU 21 sets a target area for an editing operation (target edition area) for the enclosing figure in a second image memory 27 from the coordinate data of the enclosing figure.

An image register memory 25 stores each image data of various shapes of enclosing figures handwritten with the present device, together with data representing the size of each enclosing figure and image data displayed within this enclosing figure.

The first image memory 26 stores latest image data, handwritten in pen on the screen of the input/display device 13, in a bit map form. The second image memory 27 stores image data, which has already been input and which is currently displayed on the screen, in a bit map form.

A display memory 28 is a frame memory for storing image data to be displayed on the display section 13a, in a bit map form.

A display controller 29 reads image data from the display memory 28, converts this data to a serial video signal and outputs the video signal to the display section 13a. The display controller 29 also supplies horizontal and vertical sync signals to the display section 13a to display the image data, stored in the display memory 28, on the display section 13a.

In response to an instruction from the CPU 21, an image processor 31 performs an editing process, associated with a figure or pattern recognized by the image recognizing section 24, on the image data in the area specified as the target edition area. Processing, such as enlargement of image data and reduction of image data, in the editing process is executed by an arithmetic operation section 33. New image data acquired by the editing process is sequentially written in an image developing memory 32. When the editing process is complete, the result of editing the graphical image (edited image data) stored in the image developing memory 32 is sent to the target edition area in the second image memory 27.

The image developing memory 32 is a bit-map type memory for temporarily storing data located in the target edition area in the second image memory 27, which has originated from the editing operations, like enlargement or reduction, executed in the above manner by the image processor 31.

The arithmetic operation section 33 executes an editing operations such as an enlargement or reduction, on image data mapped in the target edition area in the second image memory 27 under the control of the image processor 31.

A page file 34 stores one page (corresponding to one screen of the display section 13a) of a document prepared by writing in pen. Every time one page of a document is prepared on the input/display device 13, the CPU 21 writes this document in the page file 34.

A description will now be given of how to edit image data according to this embodiment having the above-described structure, with reference to FIGS. 3A to 3D.

FIGS. 3A to 3D are exemplary diagrams for explaining how to copy a part of a handwritten input which has already been entered. In FIGS. 3A to 3D, rectangular frames indicate the display screen of the input/display device 13. Six "x" marks 41 at the upper left, two triangles 42 at the lower left, and a spiral mark 43 at the upper right in FIG. 3A indicate image data of already input characters, numerals or symbols.

Suppose that after handwriting the image data using the pen 11, the user wants to copy the six "x" marks 41 at the upper left to a lower right in slight enlargement.

In this case, the user should write an enclosing figure 44 entirely enclosing the six "x" marks 41, in one stroke, as exemplified in FIG. 3B. This enclosing figure 44 may be closed or open.

When the data processing system recognizes that this handwritten enclosing figure 44 is a figure to indicate edition of image data inside this "enclosing figure," the area inside this enclosing figure 44 is automatically set as a target edition area.

The user then writes an enclosing figure 45, larger than the previous enclosing figure 44, in one stroke at the desired copying destination at the lower right as shown in FIG. 3C. Consequently, the image data enclosed by the previous enclosing figure 44 (six "x" marks 41) is displayed or copied at the lower right as image data (six "x" marks 46) in slight enlargement as shown in FIG. 3D.

The figure which specifies copying has no specific shape, and may be any enclosing figure as will be discussed in more detail later. The enclosing figure is registered together with the image data inside this enclosing figure in the image register memory 25.

An operation for accomplishing such an editing process will be described with reference to a flowchart in FIG. 4.

When the user handwrites data on the input/display device 13 using the pen 11, the coordinate input section 13b detects the coordinates (coordinates of the penned position on a normalized coordinate system set on the coordinate input section 13b) of the handwritten input and informs the CPU 21 of the coordinate data by an interruption (step S1). In this embodiment, the normalized coordinate system set on the display section 13a matches with that on the coordinate input section 13b.

The CPU 21 prepares image data equivalent to the time-sequential locus the coordinate data of the handwritten input draws, and writes this image data in the first image memory 26 (step S2).

When the user completes handwriting and there is no interrupt from the coordinate input section 13b for a predetermined period of time or longer, the CPU 21 determines that handwriting is completed, performs an OR operation of newly handwritten image data stored in the first image memory 26 and the handwritten image data, which has already been input and displayed and is stored in the second image memory 27, and then writes the ORed image data in the display memory 28. The display controller 29 reads the ORed image data from the display memory 28 and displays an image corresponding to this image data, on the display section 13a (step S3).

As the user enters handwritten data in the input/display device 13 with the pen 11, the penned characters, figures, etc. will be displayed spontaneously on the input/display device 13 through the above-described operation (see FIGS. 3A to 3C).

Next, the CPU 21 checks whether or not the image data handwritten with the pen 11 and stored in the first image memory 26 is an enclosing figure (step S4). In this checking process, the CPU 21 sends the handwritten image data, stored in the first image memory 26, to the image recognizing section 24 and instructs this section 24 to discriminate whether or not the handwritten image data is an enclosing figure. The image recognizing section 24 checks whether or not the handwritten image data is an enclosing figure. The image recognizing section 24 recognizes the handwritten image data as the enclosing figure when, for example, the handwritten image data specifies an area having a certain size or a greater size. The image recognizing section 24 sends the recognition result to the CPU 21. When the recognition result indicates that the handwritten image data is an enclosing figure (namely, a figure indicating a copy operation) (Yes in step S4), the CPU 21 checks if image data already exist in the target edition area to be edited and which is enclosed by the handwritten enclosing figure, in the second image memory 27 (step S5).

If image data exists there (Yes in step S5), all the image data in the target edition area is inside the enclosing figure is read from the second image memory 27 (step S6).

Then, the read image data (image block) is stored (registered) at a predetermined area in the image register memory 25 together with data indicating the size of the input enclosing figure that is taken as a key figure (step S7).

Through the above operation, the image data enclosed by the handwritten enclosing figure is registered together with the enclosing figure.

The first image memory 26 is cleared (step S8). Thereafter, the flow returns to step S1 to execute a process for a next handwritten input.

FIG. 5 presents an exemplary illustration of graphical data (key figures) and the associated image data, which are both registered in the image register memory 25. As illustrated, the image register memory 25 retains graphical data (key figures) of three types of handwritten enclosing figures each indicating a copying action, and image data which has been specified to be copied by those key figures, with the key figures taken as keys.

In the illustrated example, a circular key figure 51 with an open bottom, paired with image data 51' of six "x" marks, a rectangular key figure 52 with an open bottom, paired with two pieces of spiral image data 52', and a key figure 53 having a set of an open (left) parenthesis and a closing (right) parenthesis, paired with top image data of "ADC" and bottom image data of "xx" are registered in the image register memory 25.

By handwriting enclosing figures having plural types of shapes to enclose image data to be copied, desired image data on the display screen can be easily and quickly registered in the image register memory 25 as target data for copying.

In the case where three types of key figures and image data are already stored in the key table as shown in FIG. 5, if the rectangular key figure 52 with an open bottom is handwritten in place of the circular key figure 51, at a free display area at the lower right on the input/display device 13 shown in FIG. 3C, two pieces of spiral image data 52' will be displayed within the locus of the key figure 52, in the size corresponding to the size of the handwritten input. If the key figure 53 with the parentheses is handwritten in any free display area, the image data 53' with the top data of "ADC" and the bottom data of "xx" will be displayed in the area specified by the parentheses.

Figure 4:
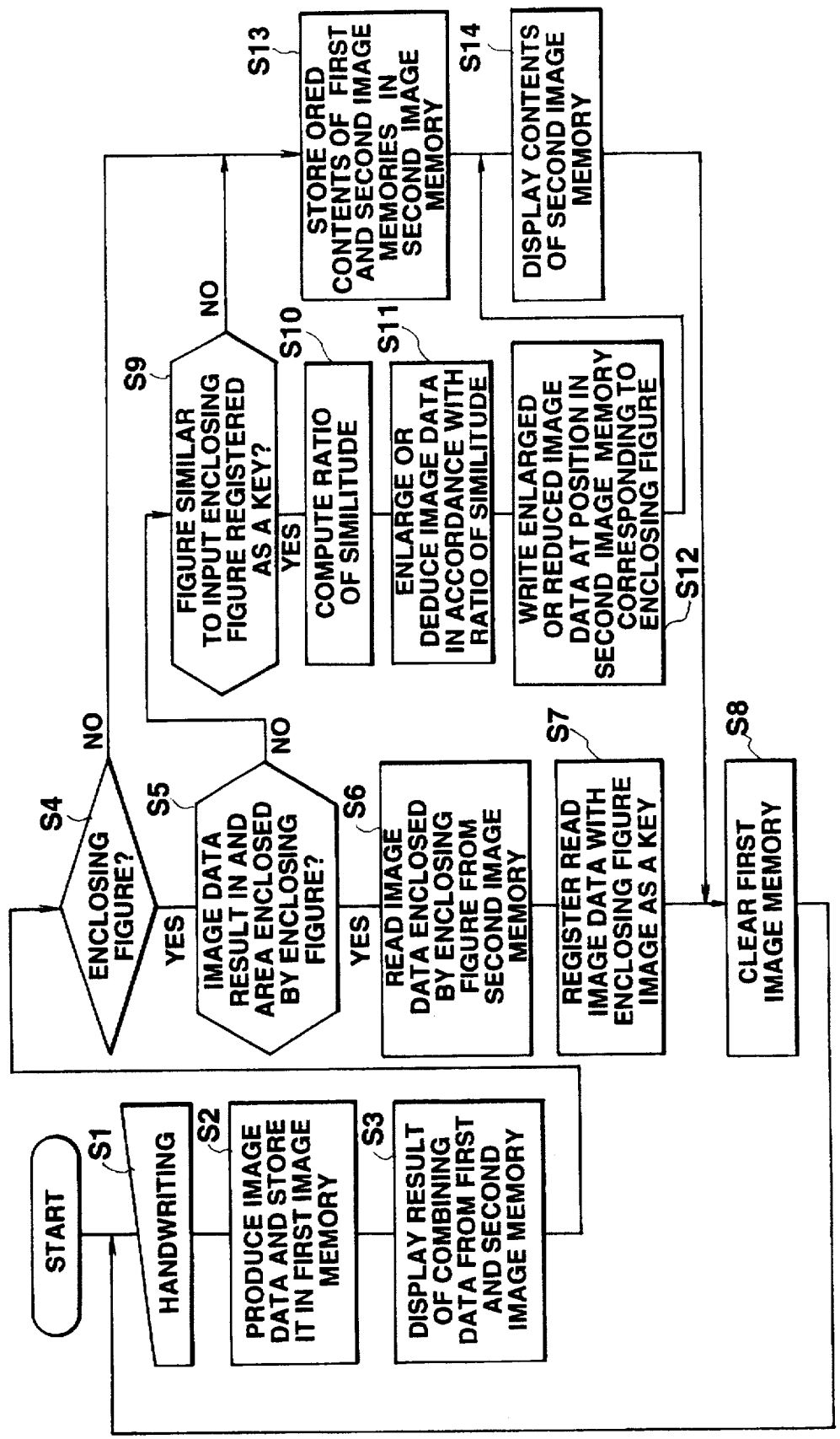
FIG. 4 is a flowchart for explaining a copying operation of the pen type input device.

Returning to the flowchart in FIG. 4, when the CPU 21 determines in step S5 that the enclosing figure has been handwritten in an unwritten area (where no image data is displayed) (No in step S5), the CPU 21 checks if graphical image data similar to the enclosing figure is registered as a key figure in the key table in the image register memory 25 (step S9). In this process, the CPU 21 sends the image data of the handwritten "enclosing figure," stored in the first image memory 26, to the image recognizing section 24 and instructs the section 24 to determine if this image data matches with any enclosing figure already registered in the memory 25. The image recognizing section 24 collates the input enclosing figure with the key figures stored in the image register memory 25 to check if the received image data of the enclosing figure is similar to any key figure using, for example, conventional similarity calculation method. When the similarity of the two pattern exceeds a predetermined value, the image recognizing section recognizes that the received image data of the enclosing figure is similar to a key figure.

The image recognizing section 24 sends the recognition result to the CPU 21.

When the recognition result indicates that the received image data of the enclosing figure is similar to a key figure, the CPU 21 recognizes that a key figure or an enclosing figure indicating the copying of the image data already stored in the image register memory 25 has been input (Yes in step S9). The CPU 21 instructs the image processor 31 to compute a ratio of a size (ratio of similitude) of the current handwritten enclosing figure to that of the key figure which is registered in the image register memory 25 and is similar to the current handwritten enclosing figure. In response to this instruction, the image processor 31 computes the ratio of similitude of both figures (step S10). Based on the computation result, the image processor 31 enlarges or reduces the image data corresponding to the key figure in the image register data 25 and sequentially writes resultant image data in the image developing memory 32 (step S11).

In response to an instruction from the CPU 21, the image processor 31 then determines the target area for copying (target copy area) on the screen of the input/display device 13, based on the coordinate data of the handwritten enclosing figure. Next, the image processor 31 sends the resultant data (enlarged or reduced image data) of the editing operation (copy), specified by the graphical image stored in the image developing memory 32, to the area in the second image memory 27 which corresponds to the determined target copy area (step S12).

The CPU 21 writes the entire image data in the second image memory 27 into the display memory 28. The display controller 29 reads the image data from the display memory 28, and displays the result of the editing operation, specified by the graphical image, on the screen of the input/display device 13 (step S14).

Thereafter, the control returns to step S8 to clear the first image memory 26 and waits for the next handwritten input in step S1.

When no key figure similar to the input enclosing figure is registered in the key table in the image register memory 25 in step S9, the CPU 21 determines that the enclosing figure does not specify a copy action but is ordinary image data (No in step S9). In this case, the CPU 21 performs an OR operation of the image data in the first image memory 26 and the image data in the second image memory 27 at associated bit positions, and stores the ORed result in the second image memory 27 (step S13). Thereafter, the control advances to the display processing in the aforementioned step S14.

Through the above operation, the processing and an area on which the processing is executed is automatically designated by handwriting the enclosing figure. That is, the area enclosed by the handwritten enclosing figure is set as a target area for the processing that is associated with this enclosing figure. Therefore, for example, to copy data, the user designates the target area for copy by simply encircling the target copy area with the enclosing figure of desired size. That is, the user can designate the copy area by a single pen operation. The enlargement or reduction of copied data can easily be executed by drawing the enclosing figure in the target copy area in an enlarged size or a reduced size.

In the first embodiments, a circular figure with an open bottom, a rectangular figure with an open bottom, and a set of parentheses are used for designating image data to be copied. However, any other symbols, marks or figures may be used for designating the data to be copied and an area on which the image data is copied. For instance, brackets may be used for designate the image data to be copied.

Although handwritten image data is copied in the first embodiment, the present invention is not limited to this type of data. For instance, the image data may be text data of character codes originating from conversion of a handwritten input in a process of recognizing handwritten characters, or externally downloaded input text data.

In the first embodiment, plural pieces of image data are registered in the image register memory 25. The present invention is not limited to this type of system. For instance, only one type of image data may be temporarily registered, and when there is an entry of a new figure designating an area of a totally different shape from the shape of the figure that has been used at the time of registering the image data previously, the registered image data is copied to the position of that figure.

According to the first embodiment, original image data is enlarged or reduced depending on the size of the figure which specifies the area on which the image data is to be copied. The present invention is not limited to this particular method. The original image data may be copied in the same size regardless of the size of the figure.

The image data registered in the image register memory 25 is automatically copied into the position where the enclosing figure has been described in the first embodiment. The present invention is not limited to this type of copying. For instance, the copy position may be designated by writing an enclosing figure after which copying may be executed using a specific command.

Second Embodiment

Figure 6:
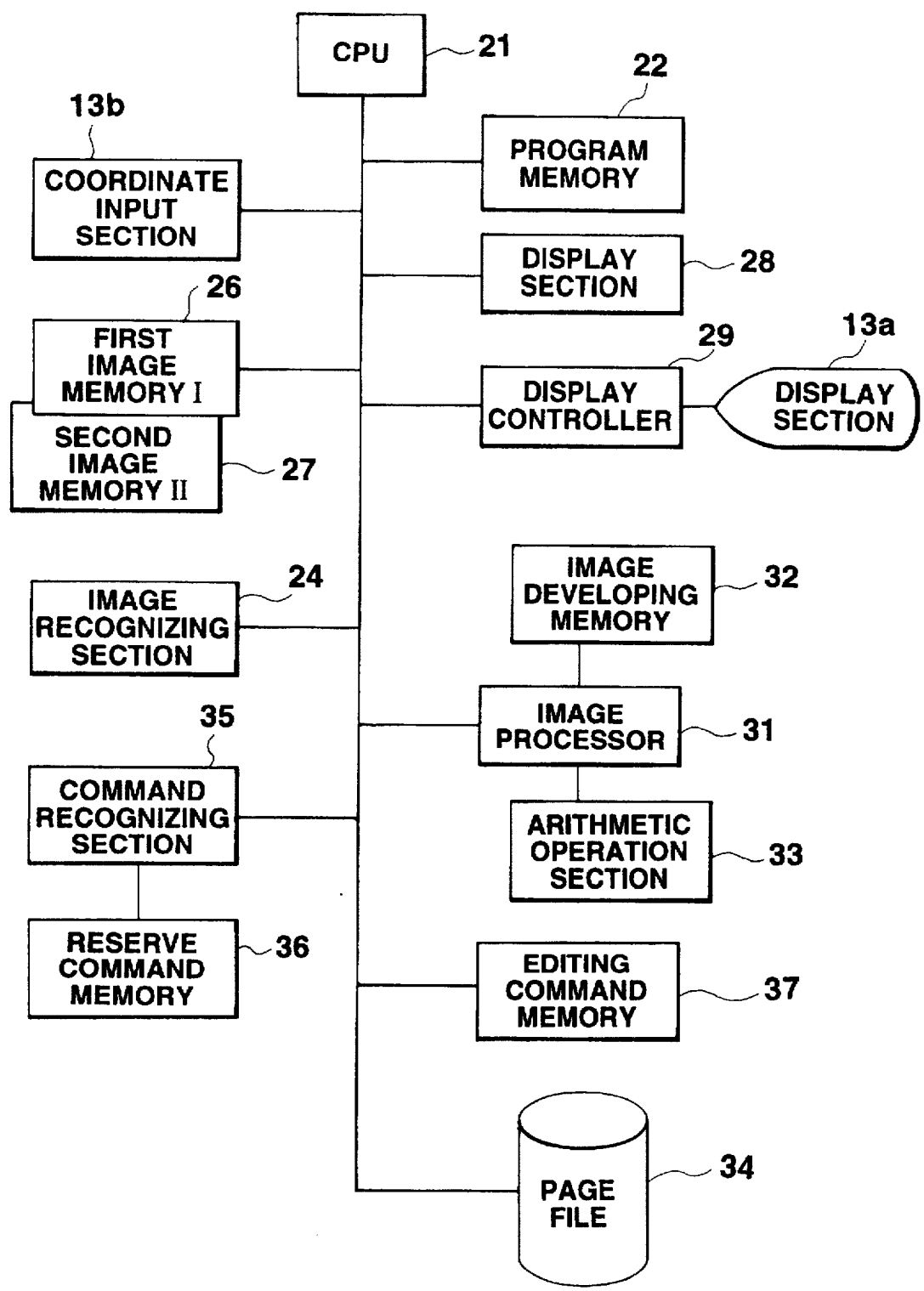
FIG. 6 is a block diagram showing a system structure according to a second embodiment.
Figure 7:
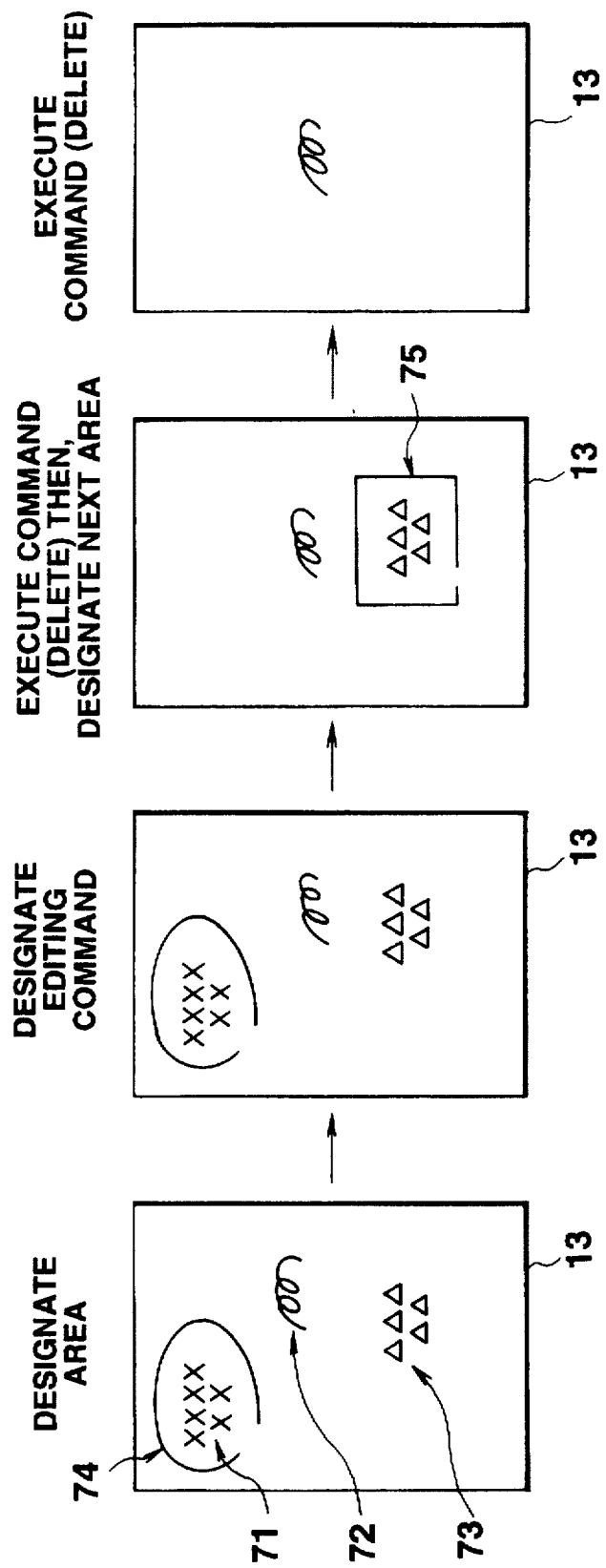
FIGS. 7A to 7D are diagrams for explaining display statuses associated with a copying operation according to the second embodiment.

FIG. 6 shows the system structure of a second embodiment.

In FIG. 6, the reference numerals "13a," "13b," "21," "22," "24," "26" to "29," and "31" to "34" represent the same parts shown in FIG. 2, so that their description will not be repeated and only additional components 35 to 37 will be discussed below.

A command recognizing section 35 recognizes handwritten data, using a conventional handwritten character recognition process, in response to an instruction from the CPU 21. The section 35 collates a sequence of characters (or symbols) obtained through the character recognition process with sequences of characters (or symbols) of editing commands previously stored in a reserve command memory 36 to recognize a handwritten editing command. The command recognizing section 35 sends the recognition result to the CPU 21.

The reserve command memory 36 stores all the editing commands available in the present data processing device, as shown in FIGS. 7, 9, 11 and 13 which will be described later, in the form of text data or symbol data (a sequence of character codes or a sequence of symbol codes).

An editing command memory 37 stores editing commands input following various shapes of the enclosing figures.

A description will now be given of how to delete image data according to the second embodiment having the above-described structure, with reference to FIGS. 7A to 7D.

FIGS. 7A to 7D are exemplary diagrams for explaining how to delete a part of a handwritten input which has already been entered. In the diagrams, rectangular frames indicate the display screen of the input/display device 13. Six "x" marks 71 at the upper left, a spiral mark 72 at the lower right and five triangles 73 lying under the mark 72 in FIG. 7A indicate image data of already input characters, numerals or symbols.

Suppose that after handwriting image data using the pen 11, the user wants to delete the six "x" marks 71 at the upper left and the five triangles 73 at the lower left.

In this case, the user should first write an enclosing figure 74 entirely enclosing only the six "x" marks 71 to be deleted, in one stroke, to designate a deleting area, as exemplified in FIG. 7B. This enclosing figure 74 may be closed or open.

When the data processing system recognizes that this handwritten enclosing figure 74 is a figure to indicate an editing operation on image data inside this "enclosing figure," this system sets the area inside this enclosing figure 74 as a target edition area.

As shown in FIG. 7B, the user then writes "delete," a reserved editing command, near the enclosing figure (to the immediate lower right in the diagram). As a result, the image data (six "x" marks 71) inside the enclosing figure 74 will be deleted (erased), as shown in FIG. 7C. This editing command "delete" is automatically registered in this data processing system.

Subsequently, the user writes a rectangular enclosing figure 75 entirely enclosing the five triangles 73 at the lower right in one stroke, to designate a deleting area again, as exemplified in FIG. 7C. It is apparent that the figure which specifies an editing area has no specific shape, and may have any shape as long as it can be recognized as an enclosing figure.

When the data processing system recognizes that this handwritten figure 75 is an enclosing figure, this system automatically sets the area inside this enclosing figure 75 as a target edition area and executes the previously registered editing command "delete" with respect to the image data (five triangles 73) in the target edition area.

Consequently, the image data (five triangles 73) designated by the enclosing figure 75 is deleted (erased) as shown in FIG. 7D. The editing command the user can enter together with the enclosing figure is not limited to the command "delete" but other commands, such as a command to alter the typeface to a boldface, and a command to change color in the case of using a color display, may also be used.

An operation for accomplishing an editing process, such as deletion of image data or alteration of a typeface in accordance with a handwritten enclosing figure, will be described with reference to a flowchart in FIG. 8.

When the user handwrites data on the input/display device 13 using the pen 11, the coordinate input section 13b detects the coordinates of the handwritten input (coordinates of the penned position on a normalized coordinate system set on the coordinate input section 13b) and informs the CPU 21 of the coordinate data by an interruption (step A1). The normalized coordinate system set on the display section 13a matches with that on the coordinate input section 13b in this embodiment.

The CPU 21 prepares image data equivalent to the time-sequential locus the coordinate data of the handwritten input draws, and writes this image data in the first image memory 26 (step A2).

When the user completes handwriting and there is no interrupt from the coordinate input section 13b for a predetermined period of time or longer, the CPU 21 determines that handwriting is completed. The CPU 21, performs an OR operation of newly handwritten image data stored in the first image memory 26 and the handwritten image data, which has already been input and displayed and is stored in the second image memory 27. Then, the CPU 21 writes the ORed image data in the display memory 28. The display controller 29 reads the ORed image data from the display memory 28 and displays an image corresponding to this image data, on the display section 13a (step A3).

As the user enters handwritten data in the input/display device 13 with the pen 11, the penned characters, figures, etc. will be displayed spontaneously on the input/display device 13 through the above-described operation (see FIGS. 7A to 7C).

Next, the CPU 21 checks whether or not the handwritten image data stored in the first image memory 26 is an enclosing figure (step A4). In this process, the CPU 21 sends the handwritten image data, stored in the first image memory 26, to the image recognizing section 24 and instructs this section 24 to discriminate whether or not the handwritten image data is an enclosing figure. The image recognizing section 24 checks whether or not the handwritten image data is a figure specifying an area having a certain size or a greater size. If yes, the image recognizing section 24 recognizes the handwritten image data is an enclosing figure. The image recognizing section 24 sends the recognition result to the CPU 21. When the recognition result indicates that an enclosing figure indicating an editing area has been input (Yes in step A4), the CPU 21 refers to the editing command memory 37 to check if an editing command is stored (registered) therein (step A5).

When detecting that no editing command is registered (No in step A5), the CPU 21 waits for the next handwritten input and performs a sequence of processes of steps A9 to A11, similar to those of the steps A1 to A3, on the handwritten image data following the enclosing figure.

Accordingly, the image data such as the handwritten editing command following the enclosing figure will be spontaneously displayed together with the enclosing figure on the input/display device 13 (see FIG. 7B, for example).

Next, the CPU 21 checks whether or not the image data in the first image memory 26, which has been handwritten following the enclosing figure, is a reserved editing command (step S12). In this process, the CPU 21 sends the handwritten image data, stored in the first image memory 26, to the command recognizing section 35 and instructs this section 35 to discriminate whether or not the handwritten image data is a reserved editing command. The command recognizing section 35 collates the transferred image data with the editing command stored in the reserve command memory 36 using a conventional pattern recognition method. The command recognizing section 35 sends the collation result to the CPU 21.

When the collation result indicates that a reserved editing command has been input (Yes in step A12), the CPU 21 registers (stores) this editing command in the editing command memory 37 (step A13).

The CPU 21 then performs the editing operation associated with this editing command on the image data displayed in the area enclosed by the enclosing figure in the second image memory 27 (step A6).

Then, the CPU 21 displays the contents (edited results) of the second image memory 27 on the input/display device 13 (step A7).

After clearing the contents of the first image memory 26 (step A8), the CPU 21 returns to step A1.

Through the above-described operation, when the user handwrites the "delete" command following the previously input enclosing figure, the "delete" command is registered and is executed, after which the displayed enclosing figure and the command are erased so that the image data previously enclosed by the enclosing figure is erased as shown in FIG. 7C, for example.

When a handwritten "boldface" command is input, the image data previously enclosed by the enclosing figure is displayed in boldface.

When the handwritten image data following the enclosing figure is not a reserved editing command in the aforementioned step A12 (No in step A12), the CPU 21 determines that the handwritten image data is ordinary image data. In this case, the CPU 21 performs an OR operation of the image data in the first image memory 26 and the image data in the second image memory 27 at associated bit positions, and stores the ORed result in the second image memory 27 (step A15) before advancing to the aforementioned step A8.

Accordingly, ordinary handwritten image data following the enclosing figure will be input directly.

When the handwritten editing command is already stored (registered) in the editing command memory 37 in the aforementioned step A5 (Yes in step A5), the CPU 21 goes directly to the aforementioned step A6.

Once an editing command is registered, therefore, this editing command can be repeatedly executed by repeatedly inputting enclosing figures.

When the handwritten image data is ordinary image data, not an enclosing figure, in the aforementioned step A4 (No in step A4), the CPU 21 determines that the editing operation has been completed and deletes the editing command registered in the editing command memory 37 (step A14) before proceeding to the aforementioned step A15.

When the user stops the continuous inputting of the enclosing figure in the above-described operation, the execution of the editing command is terminated and the registration of that editing command is cleared, so that the operation returns to the inputting and execution of the ordinary image data.

Third Embodiment

A third embodiment of the present invention will now be discussed.

According to the second embodiment, only one editing command can be registered at a time and this single editing command after registration is executed by inputting an arbitrary enclosing figure. According to the third embodiment, in contrast, a plurality of editing commands can be registered in association with a plurality of enclosing figures, one editing command for one enclosing figure. Therefore, the user can selectively execute a desired editing command from among a plurality of editing commands by inputting a figure similar to a predetermined registered enclosing figure.

The outline and system structure of the data processing system according to the third embodiment are the same as those of the second embodiment, except that the contents in the editing command memory 37 in the system shown in FIG. 6 differ from those of the second embodiment as mentioned just above.

FIG. 9 presents an exemplary illustration of a way of registering editing commands in the editing command memory 37 in the third embodiment.

As shown in this diagram, the editing command memory 37 stores a plurality of handwritten editing commands and plural types of enclosing figures as keys (key figures) in one-to-one association. In the illustrated example in FIG. 9, a "delete" command specifying deletion of image data in an editing area is stored at the top with a round enclosing figure with the lower left partially open as a key figure, a "red" command designating a display of the image data in the editing area in red is registered next with a rectangular enclosing figure with an open bottom as a key figure, and a "boldface" command specifying a boldface display of the image data in the editing area is finally registered with an enclosing figure consisting of parentheses as a key figure. Those enclosing figures and editing commands are registered in the editing command memory 37 by, for example, a predetermined operation by the user using a pen.

FIGS. 10A to 10D and 11A to 11D are exemplary diagrams for explaining how to register the enclosing figures and editing commands and how to execute the registered editing commands.

In FIG. 10A, four "x" marks 81 at an upper portion, a spiral mark 82 at the lower left and two triangles 83 at the lower right indicate image data of already input characters, numerals, symbols or the like.

Suppose that the user wants to delete the four "x" marks 81 at the upper portion. In this case, the user should first write a round enclosing figure 84 entirely enclosing the four "x" marks 81 to be deleted, in one stroke, as shown in FIG. 10A. Then, the user writes "delete," an editing command, near the enclosing figure, for example, to the immediate lower right in FIG. 10B. As a result, the image data (four "x" marks 81) inside the enclosing figure 84 will be deleted (erased), as shown in FIG. 10C. This editing command "delete" and the round enclosing figure 84 are automatically registered in the editing command memory 37.

If it becomes necessary to delete the image data two triangles 83) under the deleted image data (four "x" marks 81), the user has only to enclose those two triangles 83 with a round enclosing figure 85 similar to the previously registered enclosing figure 84. That is, the user should draw, in one stroke, the enclosing figure 85 similar in shape to the enclosing figure 84 in accordance with the size of the image data to be deleted, thereby designating a deleting area.

The data processing device recognizes that this handwritten figure 85 is a round enclosing figure similar to the already registered enclosing figure 84, through a conventional patter matting process. That is, the handwritten figure 85 has a similarity greater than a predetermined value with the registered enclosing figure 84. Then, the CPU 21 sets the area inside this enclosing figure 85 as a target edition area. The CPU 21 executes the editing command "delete," registered in association with the enclosing figure 84, with respect to the data in this target area to be edited.

Consequently, the image data (two triangles 83) enclosed by the enclosing figure 85 is deleted (erased) as shown in FIG. 10D.

Referring to the exemplary diagrams of FIGS. 11A to 11D, a description will now be given of a method of rewriting part of the already handwritten data in a boldface.

In FIG. 11A, two "x" marks 61 at the upper left, and a spiral mark 62 at the lower right indicate image data of already input characters, numerals, symbols or the like.

Suppose that after making such handwriting, the user wants to alter the two "x" marks 61 to a boldface. In this case, the user should also write an enclosing figure 63 (a pair of parentheses) enclosing the image data (two "x" marks 61 in the illustration) to be altered to a boldface to designate an area that is to be boldfaced, as shown in FIG. 11A.

The CPU 21 recognizes that this handwritten enclosing figure 63 is a graphical image specifying that the image data inside the enclosing figure should be edited and sets the area inside this enclosing figure 63 as a target edition area (area to be edited).

The user then writes an editing command "boldface" near the enclosing figure 63 as shown in FIG. 11B. Consequently, the image data (two "x" marks 61) enclosed by the enclosing figure 63 is boldfaced as shown in FIG. 11C. Further, the editing command "boldface" and the enclosing figure 63 (pair of parentheses) are registered in the editing command memory 37 as shown in FIG. 9.

Suppose that the user further wants to boldface the image data (one spiral mark 62) under the image data (two "x" marks 61) that has just been deleted. In this case too, the user should simply enclose only the spiral mark 62 with an enclosing figure 64 similar in shape to the previously registered enclosing figure 63, thereby designating a target edition area (area to be edited), as shown in FIG. 11C.

The CPU 21 recognizes that this handwritten enclosing figure 64 is an enclosing figure of parentheses similar to the already registered enclosing figure 63, automatically sets the area inside this enclosing figure 64 as a target edition area, and executes the editing command "boldface," registered in association with the enclosing figure 63, with respect to the data inside this target edition area.

Accordingly, the editing command "boldface," registered in association with the enclosing figure 63, is executed with respect to the image data (spiral mark 62) inside the enclosing figure 64. Therefore, the spiral mark 62 is boldfaced as shown in FIG. 11D.

Once an editing command is written together with its associated enclosing figure to perform an editing operation, therefore, the desired edition already performed will be carried out promptly from the second time by simply drawing the enclosing figure corresponding to the desired editing command to designate the editing area.

Figure 12:
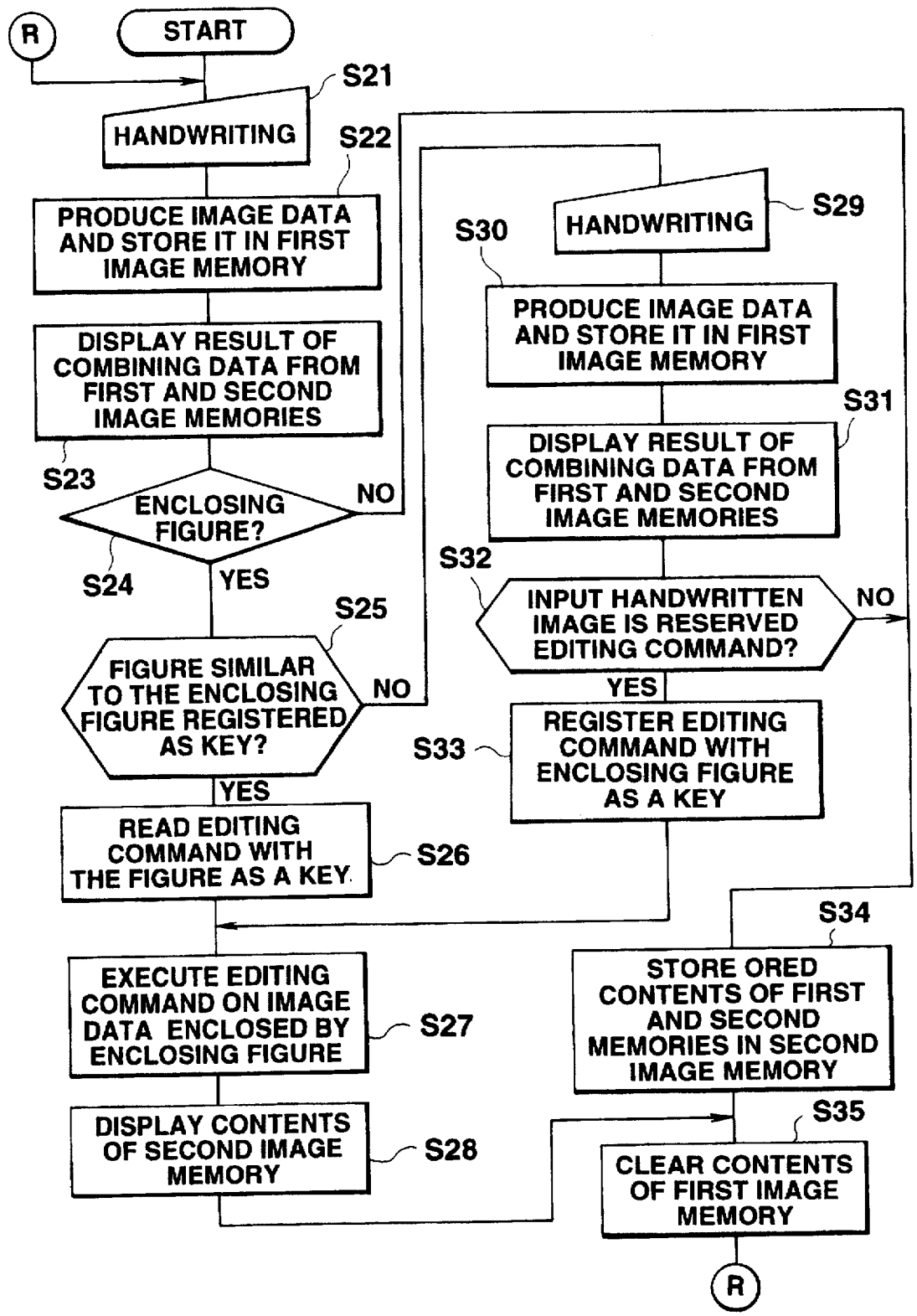
FIG. 12 is a flowchart for explaining an operation based on an editing operation according to the second embodiment.
Figure 4:
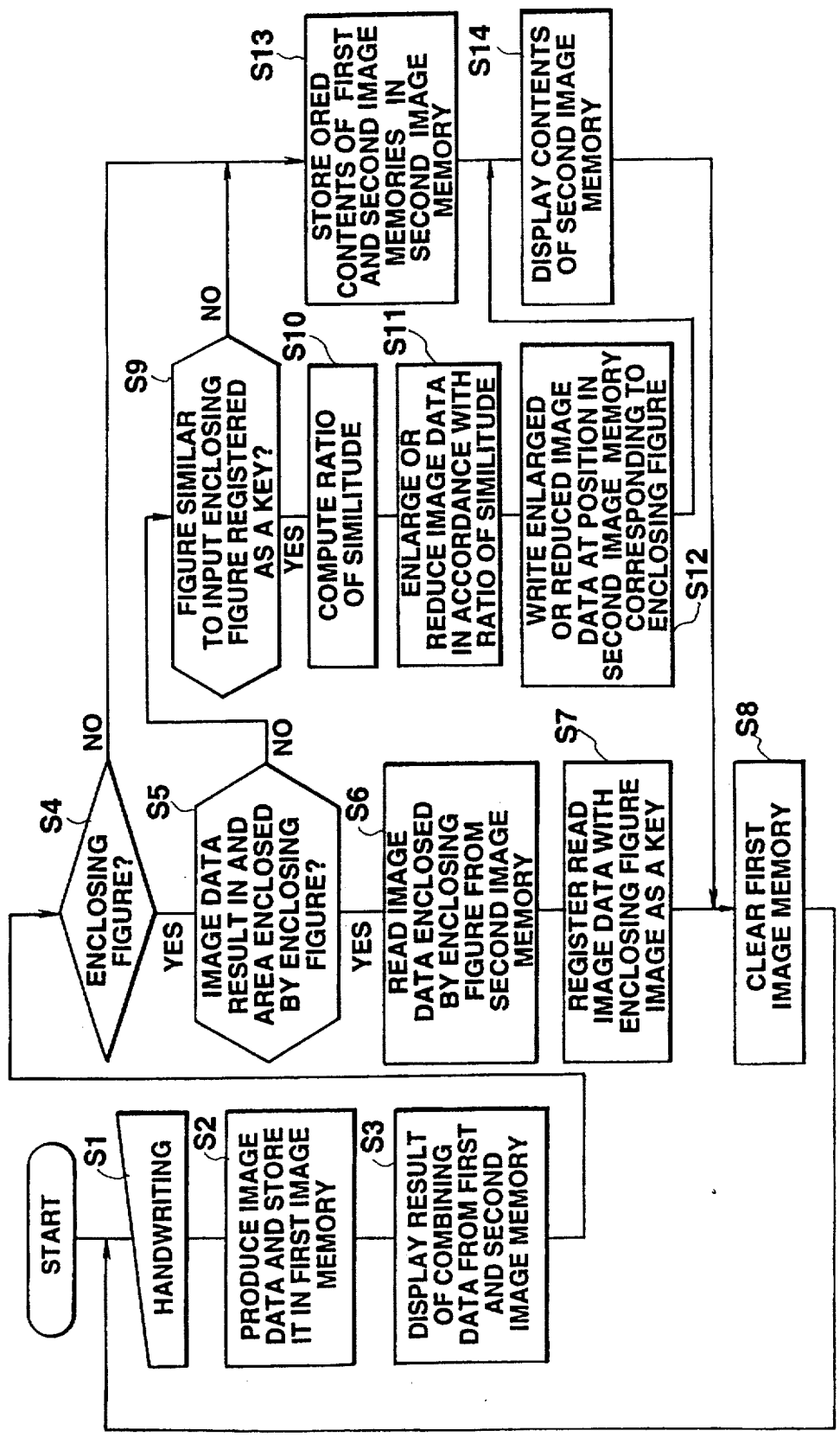

The operation of the third embodiment will be described below with reference to a flowchart in FIG. 12.

Figure 8:
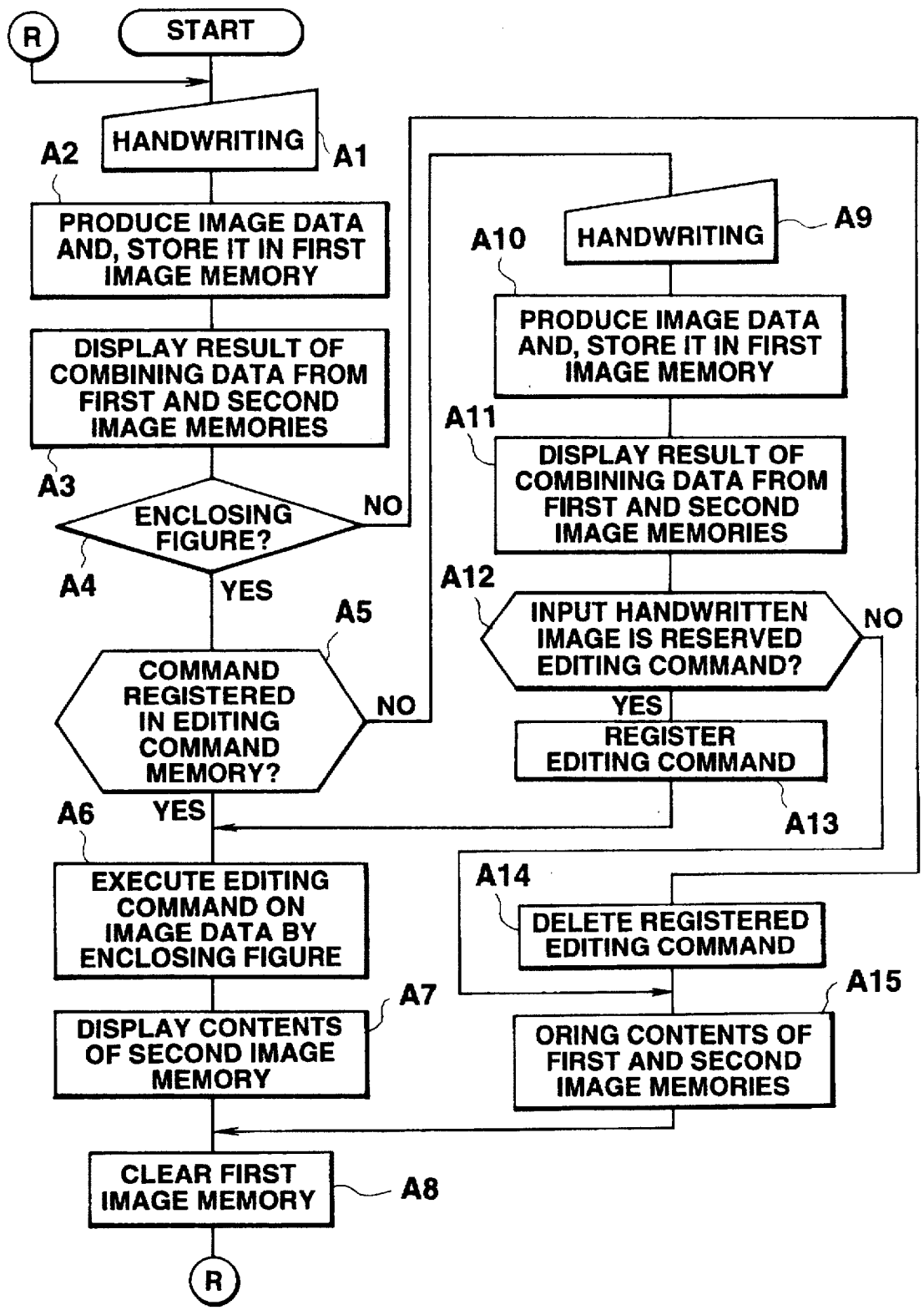
FIG. 8 is a flowchart for explaining an operation based on an editing operation according to the second embodiment.

When the user makes a handwritten entry on the input/ display device 13 with the pen 11, processes in steps S21 to S24 similar to those of the steps A1 to A4 in the flowchart in FIG. 8 are performed to determine whether an enclosing figure or ordinary image data has been input.

When recognizing that the input figure is an enclosing figure (Yes in step S24), the CPU 21 collates the enclosing figure with key figures stored (registered) in the editing command memory 37 to check to which key figure the enclosing figure is similar or analogous, with, for example, a conventional pattern matching process (step S25).

If the collation result shows that a key figure similar or analogous to the input enclosing figure is registered in the editing command memory 37 (Yes in step S25), the editing command associated with that key figure is read from the editing command memory 37 (step S26).

Then, the editing command is executed on the image data in the second image memory 27, which is located in the target edition area enclosed by the currently handwritten enclosing figure (step S27).

In this editing process, the CPU 21 recognizes the area in the second image memory 27 which corresponds to the target edition area enclosed by the enclosing figure based on the coordinate data of the handwritten enclosing figure on the screen of the input/display device 13, or the data on the position of the enclosing figure stored in the first image memory 26.

When the read editing command is the "delete" command, the CPU 21 deletes the image data in the target edition area in the second image memory 27 through the above-described operation. When the editing command is the "boldface" command, the CPU 21 sends the image data in the target edition area in the second image memory 27 to the image processor 31 and instructs the processor 31 to execute a process to boldface the transferred image data.

In response to the instruction from the CPU 21, the image processor 31 causes the arithmetic operation section 33 to perform the process of boldfacing the image data. The CPU 21 then writes new image data originating from this processing into the image developing memory 32. The CPU 21 then transfers the image data (image data boldfaced by the "boldface" command), stored in the image developing memory 32, to the associated area in the second image memory 27.

Thereafter, the CPU 21 performs an OR operation of the image data in the first image memory 26 and the image data in the second image memory 27 at associated bit positions, and stores the ORed result in the second image memory 27 (step S28). Next, the CPU 21 clears the first image memory 26 (step S35) and waits for the next handwritten input.

When detecting that no key figure similar or analogous to the input enclosing figure is registered in the editing command memory 37 in the aforementioned step S25 (No in step S25), the CPU 21 waits for the next handwritten input (step S29).

Then, the CPU 21 performs a sequence of processes of steps S29 to S31, similar to those of the aforementioned steps S21 to S23, on the handwritten image data following the enclosing figure in steps A9 to A11.

Accordingly, the image data such as the handwritten editing command following the enclosing figure will be spontaneously displayed together with the enclosing figure on the input/display device 13.

Next, the CPU 21 checks whether or not the image data in the first image memory 26, which has been handwritten following the enclosing figure, is a reserved editing command (step S32). In this process, the CPU 21 sends the handwritten image data, stored in the first image memory 26, to the command recognizing section 35 and instructs this section 35 to discriminate whether or not the handwritten image data is a reserved (registered) editing command. The command recognizing section 35 collates the transferred image data with the editing command stored in the reserve command memory 36 and sends the collation result to the CPU 21.

When the collation result indicates that a reserved editing command has been input (Yes in step S31), the CPU 21 stores (registers) this editing command in a predetermined area in the editing command memory 37 using the previously input enclosing figure as a key (step S33). The CPU 21 then proceeds to the aforementioned step S27.

When the user pens an editing command following an enclosing figure that has not yet been registered in the editing command memory 37, this editing command is registered with the enclosing figure as a key. The editing operation association with this editing command is performed on the image data in the area enclosed by the enclosing figure.

When determining in the aforementioned step S32 that ordinary image data has been input (No in step S32), the CPU 21 performs an OR operation of the image data in the first image memory 26 and the image data in the second image memory 27 at associated bit positions, and stores the ORed result in the second image memory 27 (step S34). And then, the control proceeds to the aforementioned step S35. Accordingly, the previously input enclosing figure and the image data subsequently input will both be processed as ordinary image data. That is, even an enclosing figure can be input as ordinary image data.

When the handwritten image data is not determined as an enclosing figure in the aforementioned step S24 (No in step S24), the CPU 21 determines that ordinary image data has been input and proceeds to the step S34.

Consequently, continuous inputting of ordinary image data can be executed.

Although a character image, such as "delete" or "boldface" indicating the content of an editing operation is handwritten as an editing command in the second and third embodiments, the present invention is not limited to this input method. For example, a symbolic image, like the "x" mark or a sawtooth mark, may be handwritten as the "delete" command as shown at the top on the table in FIG. 13. Likewise, a spiral mark with the upward arrowhead or an encircled letter "C" may be handwritten as the "copy" command as shown in the second row on the table. The types of commands are not limited to the mentioned ones, but a "move" command indicating the shifting of image data within the editing area shown in the third row on the same table, a "red" command instructing a display of the image data in the editing area in red as in the fourth row, or other commands may be used as well. The "move" command may be handwritten with an encircled letter "M" or a spiral mark with a downward arrowhead. The "red" command may be handwritten by "Red" or its initial letter "R."

Although editing operation is performed only on the handwritten image data in the second and third embodiments, the present invention is not limited to this type. For instance, the image data may be text data of character codes originating from conversion of a handwritten input in a process of recognizing handwritten characters, or externally downloaded input text data.

Although an enclosing figure is input as a figure to specify a target area to be edited in this embodiment, the present invention is not limited to this particular input method. Any symbols, marks, patterns such as brackets, may be used for designating an area. For example, brackets at the upper left corner and lower right corner of the area where the image data to be copied is displayed may be used for specifying the area.

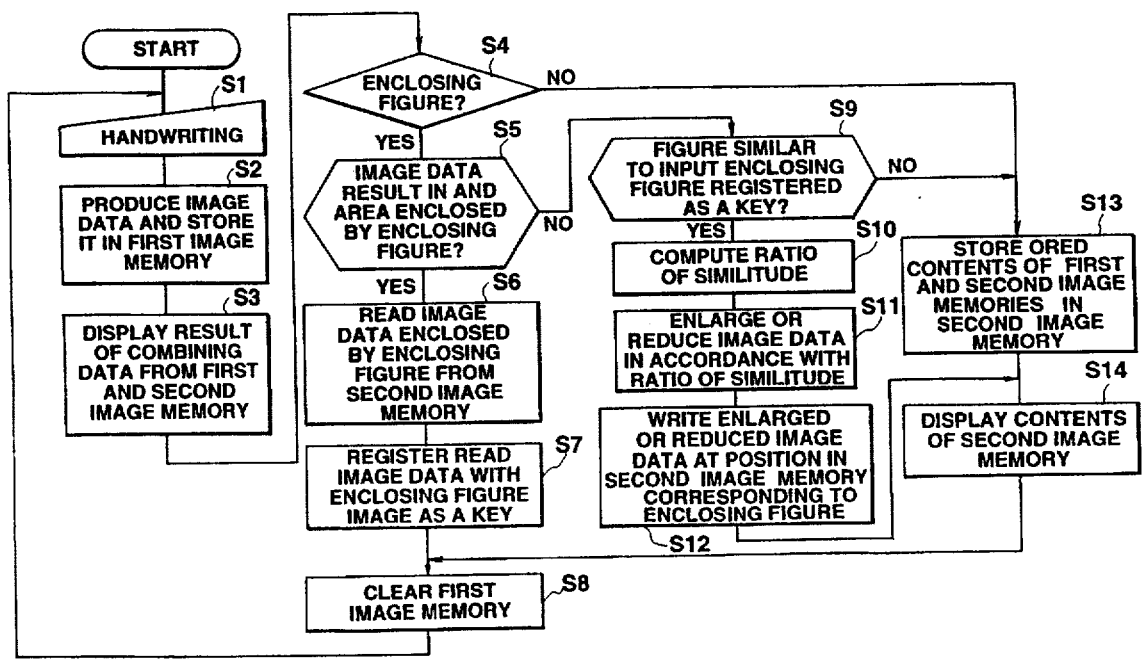

What is claimed is:

1. A data editing method for a pen type input device having a display screen for displaying data and inputting any handwritten image on said display screen by a pen operation, said method comprising the steps of:

specifying data on said display screen, at a position corresponding to a first figure image of a plurality of differently shaped images, as target data to be edited, when said first figure image is handwritten by a pen operation at a first position on said display screen;

storing said specified target data in association with said first figure image;

determining if a second figure image of the plurality of differently shaped images, when handwritten by a new pen operation at a second position on said display screen, has a predetermined similarity in shape with said first figure image; and displaying said specified target data at a display position on said display screen corresponding to said handwritten position of said second figure image if said second figure image is determined to be similar in shape to said first figure image, wherein when the first figure image and the second figure image are at least substantially similar in shape to each other, then data to be edited is displayed in the area defined by the second figure image.

2. The method according to claim 1, further comprising the steps of:

comparing, when it is determined that said second figure image is at least substantially similar in shape to said first figure image, a drawing size of said second figure image with that of said first figure image; and displaying, when displaying said target data to be edited at a display position on said display screen corresponding to said handwritten position of said second figure image, said target data in enlargement or in reduction based on a result of comparison between said drawing size of said second figure image and that of said first figure image.

3. A data processing system including a display having a display screen for displaying data including character data and image data, and for processing the data displayed on the display screen, the data processing system comprising:

a pen type pointing member, operated by a user, for writing an image selected from a plurality of differently shaped images, on the display screen;

imaging indicating means, responsive to operation of said pen type pointing member, for detecting a position and a trace of the pen type pointing member operated on the display screen, and for indicating the image written on the display screen by said pen type pointing member based on the detected position and trace of the operated pen type pointing member;

a memory;

data specifying means for specifying data displayed within an area defined by the image indicated on said display screen by said image indicating means, and for registering in said memory the specified data in combination with the image indicated on the display screen;

determining means for, when another image selected from the plurality of differently shaped images is written on the display screen by said pen type pointing member and is indicated thereon by said image indicating means, determining whether the another image indicated by said image indicating means is substantially similar in shape to the image registered in said memory; and copying means for reading out from said memory the data specified by said data specifying means when said determining means determines that the another image indicated by said image indicating means is at least substantially similar in shape to the image registered in said memory, and for copying the read out data within an area that is defined by the another image indicated on the display screen of said display by the image indicating means.

4. A data processing system including a display having a display screen for displaying data including character data and image data, and for processing the data displayed on the display screen, the data processing system comprising:

a pen type pointing member, operated by a user, for writing a first plurality of images selected from a plurality of differently shaped images, on the display screen;

imaging indicating means, responsive to operation of said pen type pointing member, for detecting a plurality of positions and a plurality of traces of the pen type pointing member operated on the display screen, and for indicating a plurality of images on the display screen by said pen type pointing member based on the plurality of detected positions and the plurality of traces of the operated pen type pointing member;

a memory;

data specifying means for specifying data displayed within one of a plurality of areas defined by the plurality of images indicated on said display screen by said image indicating means, and for registering in said memory the specified data in combination with the corresponding one of the plurality of images indicated on the display screen;

determining means for, when a second plurality of images selected from the plurality of differently shaped images are written on the display screen by said pen type pointing member and are indicated thereon by said image indicating means, determining whether at least one of the second plurality of images indicated by said image indicating means is substantially similar in shape to one of the first plurality of images registered in said memory; and copying means for reading out from said memory the data specified by said data specifying means when said determining means determines that the another image indicated by said image indicating means is at least substantially similar in shape to one of the plurality of images registered in said memory, and for copying the read out data within an area that is defined by the another image indicated on the display screen by the image indicating means.

* * * * *

UNITED STATES PATENT AND TRADEMARK OFFICE
CERTIFICATE OF CORRECTION

PATENT NO. : 5,761,340
DATED : Jun. 2, 1998
INVENTOR(S) : Suzuki

It is certified that error appears in the above-identified patent and that said Letters Patent is hereby corrected as shown below:

The title page should be deleted to appear as per attached title page.

Please delete drawing sheet 4 of 12 and substitute drawing sheet 4 of 12 as per attached.

Signed and Sealed this

Twenty-third Day of March, 1999

Attest:

Q. TODD DICKINSON

*Attesting Officer*    *Acting Commissioner of Patents and Trademarks*

United States Patent [19]

Suzuki

[11] Patent Number: 5,761,340
[45] Date of Patent: Jun. 2, 1998

[54] DATA EDITING METHOD AND SYSTEM FOR A PEN TYPE INPUT DEVICE

[75] Inventor: Hideo Suzuki, Tokyo, Japan

[73] Assignee: Casio Computer Co., Ltd., Tokyo, Japan

[21] Appl. No.: 614,953

[22] Filed: Mar. 11, 1996

Related U.S. Application Data

[63] Continuation of Ser. No. 228,520, Apr. 15, 1994, abandoned.

[30] Foreign Application Priority Data

Apr. 28, 1993 [JP] Japan .................................. 5-102059
May 21, 1993 [JP] Japan .................................. 5-119753

[51] Int. Cl.⁶ .................................. G06K 9/00; G06K 9/03
[52] U.S. Cl. .................................. 382/189; 382/187; 382/311; 345/179
[58] Field of Search .................................. 382/187, 189, 382/313, 309, 311, 186; 345/179; 364/237.9, 709.11; 178/18

[56] References Cited

U.S. PATENT DOCUMENTS

| | | | |
|---|---|---|---|
| 4,475,239 | 10/1984 | van Raamsdonk | 382/57 |
| 4,945,504 | 7/1990 | Nakama et al. | 364/709.11 |
| 4,972,496 | 11/1990 | Sklarew | 382/13 |
| 5,012,521 | 4/1991 | Endo et al. | 382/1 |
| 5,297,216 | 3/1994 | Sklarew | 382/189 |
| 5,414,228 | 5/1995 | Yamashita | 382/13 |

OTHER PUBLICATIONS

"Mastering Windows™ 3.1", Robert Cowart, pp. 365, 367–368 & 382–383, 1993.

Primary Examiner—Leo Boudreau
Assistant Examiner—Bhavesh Mehta
Attorney, Agent, or Firm—Frishauf, Holtz, Goodman, Langer & Chick

[57] ABSTRACT

When data to be copied is enclosed on the screen of an input/display device by a figure image represented by an enclosing figure (a circle with an open part), the data is stored together with the figure image. When the same figure image is drawn in a slightly larger size in an unwritten area, a target copy area is automatically set inside the figure image and the stored data is enlarged and displayed in the target copy area according to the dimension of the set area.

4 Claims, 12 Drawing Sheets